Patented Nov. 15, 1938

2,136,681

UNITED STATES PATENT OFFICE 2,136,681

FILM DEPOSITION

Karl H. Fulton and John L. Illig, Pittsburgh, Pa., assignors to Ball Chemical Company, a corporation of Pennsylvania No Drawing. Application January 12, 1937, Serial No. 120,223

3 Claims. (Cl. 91—70)

This invention relates to the formation of a dry varnish-type protective film on solid materials, and particularly to the formation of such protective film on the surface of metals.

Primarily we have made the discovery that we may protect metallic bodies against corrosion by depositing on their surfaces from water emulsion a varnish-type drying film, which we may make suitable either for the temporary or the permanent protection of the metallic bodies; and that this may satisfactorily be performed by a bulk, or "batch," application of film-forming material to the bodies.

More specifically we have discovered that we can from a water emulsion deposit a varnish-type drying film, which as initially deposited, dried, and set is susceptible in predetermined degree to removal by water-washing, or which may approximate the character of a normal varnish film in its resistance to removal by water. Further, we have discovered that such varnish-type films, deposited from water emulsion, are subject to progressive oxidation in the manner of normal varnish films, and thus as they season tend progressively to increase their resistance to removal by water-washing.

Thus for the short-period protection of materials against degradation attendant upon exposure to moisture and similar degradation-producing agents, we are able to apply a dry protective film which may be removed without difficulty by washing with an ample quantity of water; and for longer continued protection we can deposit a film which by seasoning becomes substantially unaffected by water. We are able to effect this controlled film formation by practicing the simple and inexpensive procedure of depositing the protective films from water emulsion, and without fundamental change in the film-forming material which is deposited.

Further, we have discovered that our films, deposited from water emulsion, possess substantially the ability of normal varnish films to serve as a priming coat for a later applied varnish-type coating.

Our water-emulsion-deposited films find particular applicability in the protective coating of formed or partially formed metallic articles, such as steel pipe, bars, rods, and the like. In the case of pipe, which is the bulk article most greatly in need of protection against corrosion, our film may be applied to the pipe to inhibit corrosion pending the application of a permanent protective coating. In storage, our water-removable film protects the pipe in the interim between formation of the pipe and the application of a permanent coating to it. This removable film may be wholly and readily removed by water-washing, or in a pickle bath; alternatively, being a dry, varnish-type film, it may remain to serve as a priming coat over which to apply a coating of paint or varnish.

Fundamentally considered, we make up a water emulsion, in the water phase, from a soap, or its equivalent emulsifying agent, such as a water-soluble gum, and a drying or semi-drying oil; and by dipping or spraying so apply the emulsion to the surface of the articles or material to be coated that a protective film of drying nature is formed thereon.

We are aware that water phase emulsion of sulphonated oils, cutting oils, and similar non-drying emulsifiable ingredients, have previously been used protectively to coat metallic articles and materials. While suitable for many purposes, the utility of such coatings is limited by their non-drying nature. We are also aware that dried soapy coatings have been formed on metallic articles and materials. Such soapy coatings are also, however, limited in utility because they are indiscriminately removable by water; presenting no capacity for regulation in the degree of their resistance to removal by water, and lacking the varnish characteristic of progressive oxidation by seasoning.

For many purposes, and particularly for the protective coating of pipe, and the like, in bulk, it is desirable to make up an emulsion base which may be shipped and stored as a concentrate; and which by proportioned dispersion in water may be used to make up a working emulsion of predetermined concentration. An emulsion base formula suitable for the formation of a film removable without difficulty by water-washing may be given as follows:

*Emulsion Base Formula No. 1*

| | Parts by volume |
|---|---|
| Rosin | 75 |
| Blown linseed oil | 50 |
| 25% solution NaOH | 25 |

These ingredients are compounded, preferably with heat and agitation, until a clear homogeneous liquid is produced. Desirably a suitable stabilizer, such as pine oil, is added to the other ingredients. On the basis of the proportions given above, we have found that an addition of 25 parts by volume of pine oil gives good stability. If desired, the linseed oil, given as a typical example of a drying oil, may contain one or more of the well known drying agents, such as the lead, cobalt, manganese, and the like driers.

Desirable proportions for a working emulsion, utilizing the above concentrate formula, are one part of the concentrate to nine parts of water. This may be considered as a normal, or mean, proportioning for the working emulsion, and (considering also the composition of the base formula) may be considered to be one particularly suitable for the temporary protection of pipe.

In initially making up the working emulsion, the water of the bath is desirably unheated while the dosage of the concentrate emulsion is dispersed through it by means of mechanical agitation. By this procedure a homogenous, milky, emulsion bath is formed. The treating tank, which for the coating of pipe should be relatively large, and fitted along its sides with heating coils, is partially filled with the working emulsion. We have found an emulsion bath temperature of about 150° F. to be a good working temperature.

Still assuming that it is pipe which is to be protectively coated, a batch of pipe desirably in the form of a bundle or "lift," is immersed in the warm emulsion, and is allowed to remain in the bath until the temperature of the pipe is the same as the bath temperature. The bundle is then lifted, and excess emulsion allowed to drain back into the tank, leaving a fluid film of emulsion on both the outer and inner surfaces of the pipe. The warmth of the metal then quickly drives off the water of the emulsion, leaving a deposited film on the pipe. This film quickly dries to give the desired result. Breaking the pipe bundle, and spreading the pipe, expedites evaporation of the water and drying of the film.

The film so formed offers protection to the pipe, during storage, until final disposition of the pipe is determined; that is, for example, whether the pipe is later to be galvanized or whether it is later to receive an outer coating of paint or varnish. If the pipe is to be galvanized, the film can be readily removed by water or in the pickle bath. If the pipe is to receive an outer coat of paint or varnish, the film formed from emulsion is allowed to remain without detriment to the adhesion or desirable qualities of the outer coating.

We are also able to form on bolts and nuts a coating so thin and dry that the nuts can be run up on the threads of the bolts without clogging or stripping. Conversely, the coating is sufficiently dense and continuous, as well as sufficiently stable, that it affords good protection against weather and water-washing. The coating is dry enough to permit the nut and bolt to be painted over in their various service associations. It may be noted that it is difficult to apply uniform varnish films to such articles by dipping them in, or by brushing upon them, common varnish compositions, because of the tendency of the varnish to form drops and runs on the threads. Desirably, we apply the film-forming emulsion to metallic bodies of the type of nuts and bolts by collecting them in a meshed, or perforate, basket, and dipping the batch thus gathered in the emulsion bath.

A suitable emulsion base for this purpose may be given as follows:

*Emulsion Base Formula No. 2*

| | Parts by volume |
|---|---|
| Rosin | 75 |
| Blown linseed oil | 350 |
| 25% solution of NaOH | 25 |

For the purpose of a particularly dry, dense, film the use of a drier or driers is, for such use as the coating of nuts and bolts, particularly desirable.

We have found that inherent difficulty in producing a clear, homogeneous, liquid base emulsion in accordance with this formula may be obviated by introducing the drying oil gradually to the other ingredients, while heating and agitating the mixture.

We have found that, in the fine emulsions which we are able to produce, the films formed upon articles have remarkable uniformity in their thickness and smoothness, and may if desired be very thin.

We have noted that, while utilizing an emulsion which is in the water rather than the oil phase, we may vary the concentration of the emulsion within relatively wide limits. The usual range of concentrations employed by us is from two volumes of water to one volume of emulsion-forming ingredients, or even richer, to ten, or even more, volumes of water to one volume of emulsion-forming ingredients. By varying the concentration of emulsion-forming ingredients in the water of the emulsion, we are able to vary the thicknes of the film formed from the emulsion. For certain purposes, of which the formation of a protective film on small threaded articles may be used as typical, we may utilize an emulsion as lean as twenty volumes of water to one volume of the emulsion-forming ingredients.

In spite of the fact that the above-described films are deposited from water emulsion containing a water-soluble emulsifying agent, the films are susceptible to progressive oxidation in the manner in which oxidation progressively takes place in drying films deposited from varnish compositions of the usual solvent type. Thus, the film tends to become more resistant to water as it seasons. Advantage is taken of this quality on pipe and other articles on which the protective film is to remain as their sole protection against corrosion and other degradation for a relatively long period of time. Thus, having formed on pipe, or the like, a film which is readily removable initially by means of water, choice is given as to whether to remove such film within a relatively short length of time, or whether by seasoning to permit it to become more resistant.

It is to be understood that the degree of resistance to water, or lack of such quality in the film, is subject to control. Thus, by using the least adequate proportion of soap or equivalent emulsifying agent in the emulsion, a film, which is substantially unremovable by water, will be produced. Such film approaches correspondence to a standard varnish film.

A convenient mode of lessening the proportional inclusion of soap, or its equivalent, below the point at which the soap content is adequate to carry the emulsion, is to utilize a colloid mill or other mechanical homogenizer to give the desired stabilized dispersion. By using such mechanical agency, it is possible at will to decrease the proportion of emulsifying agent to a minimum, while obtaining an emulsion, or emulsion base, of the desired dispersion and stability. It is to be understood that mechanical agitation methods also may desirably be employed as a means of maintaining dispersion in the working emulsion as it is used for coating bodies immersed in, or sprayed with, the emulsion.

We may give alternative formulae for emulsion bases, as follows:

*Emulsion Base Formula No. 3*

| | Parts by weight |
|---|---|
| Blown linseed oil | 100 |
| Common soap | 25 |
| Water | 25 |

*Emulsion Base Formula No. 4*

| | Parts by weight |
|---|---|
| Blown linseed oil | 100 |
| Common soap | 75 |
| Water | 50 |

In both these formulae the ingredients may be compounded with gentle heating and agitation. Desirably, a stabilizer and drying agent are incorporated in each.

Of these formulae, Formula No. 3 corresponds generally to Formula No. 2, being capable of forming a water-phase emulsion which deposits a film approximating in its qualities those of a standard varnish film in the resistance to removal which it offers, having but slight susceptibility to removal by water as initially deposited from emulsion and set, and increasing in its resistance to removal by water-washing as oxidation progressively takes place in it.

Films deposited from an emulsion made up from Emulsion Base Formula No. 4 have qualities approximating those deposited from an emulsion made up from Formula No. 1. These films are removable by means of water, and removable by water with relatively great facility when they are newly deposited and set.

It is to be understood that all of the drying and semi-drying oils may suitably be used in our process as ingredients producing varnish-type films. With these oils, a resin or resins, natural or synthetic, such as are used in ordinary varnishes, may also be incorporated to give desirable properties. Generally considered, our process utilizes any and all the standard varnish ingredients with the addition of an emulsifying agent or agents to produce the desired dispersion of said varnish in water emulsion form, and in desired degree to modify the character of the film. It is to be understood that we utilize the term "varnish-type" as a term of description and not of limitation, intending it to include the pigmented coating compositions commonly designated as "paints" and "enamels." When it is desired to form a pigmented film from emulsion, we have found that the flocculent pigments, such as carbon black and lamp black, which are readily brought into, and maintained in, a state of suspension are the ones most desirably incorporated to obtain pigmented coatings. We have found, however, that the heavier pigments may be used, and in the event of their use the employment of a mechanical homogenizer, or other mechanical agitator, is particularly desirable for maintaining suspension of the pigment.

By the term "varnish-type" we do not intend to define lacquer-type films, such, for example, as those formed from nitrocellulose lacquers.

It is to be understood that throughout the examples and discussion notation of specific features or ingredients, such as the use of blown rather than unblown drying oils, and the inclusion of driers, is made in the sense in which such characteristics or ingredients are noted and employed in standard varnish practice, and that specific reference to blown oils and driers is to be understood as describing illustratively a preferred practice and not as imposing a necessary, practical limitation of our process. Thus, for example, blown oils are more susceptible to rapid drying than unblown oils, and drying is further accelerated by the use of the common drying agents. This does not exclude from the scope of our process the use of unblown oils, and is not intended to indicate the use of driers as a necessary feature.

We claim as our invention:

1. The herein described method performable as a step in the manufacture of metallic pipes, and the like, of applying upon pieces of metallic pipe and like elongate metallic pieces such as bars and rods a temporary corrosion-protective coating in the form of a uniformly thin coherent film fixed to the surfaces of the pipe, rods, or bars and capable of receiving and retaining an outer coating of paint or varnish, which comprises wetting the entire exposed surface area of the elongate metallic pieces of pipe or the like by immersing them in bundles in a bath emulsion of the oil-in-water type containing drying oil as its chief ingredient and maintained at a temperature substantially above normal atmospheric temperature and below the boiling point of water, and by withdrawing the bundle from the bath into the atmosphere at approximately bath temperature quickly spreading and setting on each of the pieces composing the bundle a complete enveloping film of the character above described in rapid evaporation of the water content of the emulsion wetting the elongate metallic pieces composing the bundle at the moderately elevated temperature of the said metallic pieces.

2. The herein described method performable as a step in the manufacture of metallic pipes, and the like, of applying upon pieces of metallic pipe and like elongate metallic pieces such as bars and rods a temporary corrosion-protective coating in the form of a uniformly thin coherent film fixed to the surfaces of the pipe, rods, or bars and capable of receiving and retaining an outer coating of paint or varnish, which comprises wetting the entire exposed surface area of the elongate metallic pieces of pipe or the like by immersing them in bundles in a bath emulsion of the oil-in-water type containing drying oil as its chief film-forming ingredient and maintained at a temperature between about 150° F. and the boiling point of water, and by withdrawing the bundle from the bath into the atmosphere at approximately bath temperature quickly spreading and setting on each of the pieces composing the bundle in a complete enveloping film of the character above described in rapid evaporation of the water content of the emulsion wetting the elongate metallic pieces composing the bundle at the moderately elevated temperature of the said metallic pieces.

3. The herein described method performable as a step in the manufacture of metallic pipes, and the like, of applying upon pieces of metallic pipe and like elongate metallic pieces such as bars and rods a temporary corrosion-protective coating in the form of a uniformly thin coherent film fixed to the surfaces of the pipe, rods, or bars and capable of receiving and retaining an outer coating of paint or varnish, which comprises wetting the entire exposed surface area of the elongate metallic pieces of pipe, or the like, by immersing them in bundles in a bath emulsion containing from about 5% to 30% by volume of film-forming content having drying oil as its chief ingredient while maintaining the bath at a temperature between about 150° F. and the boiling point of water, and by withdrawing the bundle from the bath into the atmosphere at approximately bath temperature quickly spreading and setting on each of the pieces composing the bundle a complete enveloping film of the character above described in rapid evaporation of the water content of the emulsion wetting the elongate metallic pieces composing the bundle at the moderately elevated temperature of the said metallic pieces.

KARL H. FULTON.
JOHN L. ILLIG.